United States Patent
Gnedin

(10) Patent No.: US 9,082,200 B2
(45) Date of Patent: Jul. 14, 2015

(54) SYSTEM FOR HISTOGRAM COMPUTATION

(71) Applicant: Marianna Gnedin, Long Grove, IL (US)

(72) Inventor: Marianna Gnedin, Long Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 78 days.

(21) Appl. No.: 14/093,861

(22) Filed: Dec. 2, 2013

(65) Prior Publication Data

US 2014/0153826 A1 Jun. 5, 2014

Related U.S. Application Data

(60) Provisional application No. 61/732,979, filed on Dec. 4, 2012.

(51) Int. Cl.
*G06K 9/00* (2006.01)
*G06T 7/40* (2006.01)

(52) U.S. Cl.
CPC ...................... *G06T 7/401* (2013.01)

(58) Field of Classification Search
CPC ................ G06F 2003/0694; G06F 2003/0695; G06F 2003/0697; G06F 2003/0691; G06F 3/067; G06F 3/0661; G06F 3/0689; G06F 3/064; G06F 3/0607; G06F 3/0617; G06F 11/201; G06F 11/2089; G06T 7/401
USPC .......................................................... 382/168
See application file for complete search history.

(56) References Cited

U.S. PATENT DOCUMENTS

| | | | | |
|---|---|---|---|---|
| 5,978,303 A | * | 11/1999 | Takasugi et al. | 365/230.03 |
| 6,587,588 B1 | * | 7/2003 | Bottou et al. | 382/240 |
| 2001/0046262 A1 | * | 11/2001 | Freda | 375/240.03 |

OTHER PUBLICATIONS

NVIDIA Corporation, "Histogram calculation in CUDA", Nov. 2007.
Ramtin Shams and R.A. Kennedy, "Efficient Histogram Algorithms for NVIDIA CUDA Compatible Devices", Research School of Information Sciences and Engineering (RSISE), The Australian National University, Canberra ACT 0200 Australia.

* cited by examiner

*Primary Examiner* — Ali Bayat

(57) ABSTRACT

A system and method includes reception of a first image data value of a digital image, determination of a first index based on the first image data value, determination of a value stored in a first array of a first shared memory at the first index, and determination of whether the value stored in the first array of the first shared memory at the first index is equal to the first image data value. If the value stored in the first array of the first shared memory at the first index is equal to the first image data value, 1 is added to a count value stored in a second array of the first shared memory at the first index. If the value stored in the first array of the first shared memory at the first index is not equal to the first image data value a count value stored in a second shared memory in association with the first image data value is updated.

20 Claims, 11 Drawing Sheets

| Index | Image Data Values | Count Value |
|---|---|---|
| 0 | -1 | 0 |
| 1 | -1 | 0 |
| 2 | -1 | 0 |
| 3 | -1 | 0 |
| 4 | -1 | 0 |
| 5 | -1 | 0 |
| 6 | -1 | 0 |
| 7 | -1 | 0 |
| 8 | -1 | 0 |
| 9 | -1 | 0 |
| 10 | -1 | 0 |
| 11 | -1 | 0 |
| 12 | -1 | 0 |
| 13 | -1 | 0 |
| 14 | -1 | 0 |
| 15 | -1 | 0 |
| 16 | -1 | 0 |
| 17 | -1 | 0 |
| 18 | -1 | 0 |

*FIG. 5*

| Index | Image Data Values | Count Value |
|---|---|---|
| 0 | -1 | 0 |
| 1 | -1 | 0 |
| 2 | -1 | 0 |
| 3 | -1 | 0 |
| 4 | -1 | 0 |
| 5 | 01110011 | 1 |
| 6 | -1 | 0 |
| 7 | -1 | 0 |
| 8 | -1 | 0 |
| 9 | -1 | 0 |
| 10 | -1 | 0 |
| 11 | -1 | 0 |
| 12 | -1 | 0 |
| 13 | -1 | 0 |
| 14 | -1 | 0 |
| 15 | -1 | 0 |
| 16 | -1 | 0 |
| 17 | -1 | 0 |
| 18 | -1 | 0 |

*FIG. 6*

| Index | Image Data Values | Count Value |
|---|---|---|
| 0 | -1 | 0 |
| 1 | -1 | 0 |
| 2 | -1 | 0 |
| 3 | -1 | 0 |
| 4 | -1 | 0 |
| 5 | 01110011 | 1 |
| 6 | -1 | 0 |
| 7 | -1 | 0 |
| 8 | -1 | 0 |
| 9 | 10010101 | 1 |
| 10 | 11010010 | 1 |
| 11 | -1 | 0 |
| 12 | -1 | 0 |
| 13 | -1 | 0 |
| 14 | -1 | 0 |
| 15 | -1 | 0 |
| 16 | -1 | 0 |
| 17 | -1 | 0 |
| 18 | -1 | 0 |

| Index | Image Data Values (510) | Count Value (520) |
|---|---|---|
| 0 | -1 | 0 |
| 1 | -1 | 0 |
| 2 | -1 | 0 |
| 3 | -1 | 0 |
| 4 | -1 | 0 |
| 5 | 01110011 | 1 |
| 6 | -1 | 0 |
| 7 | -1 | 0 |
| 8 | 10010101 | 2 |
| 9 | 11010010 | 1 |
| 10 | -1 | 0 |
| 11 | -1 | 0 |
| 12 | -1 | 0 |
| 13 | -1 | 0 |
| 14 | -1 | 0 |
| 15 | -1 | 0 |
| 16 | -1 | 0 |
| 17 | -1 | 0 |
| 18 | -1 | 0 |

FIG. 9

| Index | Image Data Values (510) | Count Value (520) |
|---|---|---|
| 0 | -1 | 0 |
| 1 | -1 | 0 |
| 2 | -1 | 0 |
| 3 | -1 | 0 |
| 4 | -1 | 0 |
| 5 | 01110011 | 1 |
| 6 | -1 | 0 |
| 7 | -1 | 0 |
| 8 | 00100011 | 1 |
| 9 | 11010010 | 1 |
| 10 | -1 | 0 |
| 11 | -1 | 0 |
| 12 | -1 | 0 |
| 13 | -1 | 0 |
| 14 | -1 | 0 |
| 15 | -1 | 0 |
| 16 | -1 | 0 |
| 17 | -1 | 0 |
| 18 | -1 | 0 |

FIG. 10

| Index | Image Data Values (510) | Count Value (520) |
|---|---|---|
| 0 | 00100001 | 11 |
| 1 | 11100101 | 8 |
| 2 | -1 | 0 |
| 3 | 01010101 | 554 |
| 4 | 00110010 | 123 |
| 5 | 01110011 | 22 |
| 6 | -1 | 0 |
| 7 | 11000111 | 33 |
| 8 | 00100001 | 433 |
| 9 | 00111000 | 111 |
| 10 | 11010010 | 1 |
| 11 | 00111101 | 9 |
| 12 | 11111001 | 22 |
| 13 | 00010011 | 57 |
| 14 | -1 | 0 |
| 15 | 11111111 | 854 |
| 16 | 00010110 | 55 |
| 17 | -1 | 0 |
| 18 | 11101000 | 333 |

FIG. 14

| | Image Data Values | Count Value |
|---|---|---|
| 0 | 00100001 | 11 |
| 1 | 11100101 | 8 |
| 2 | -1 | 0 |
| 3 | 01010101 | 554 |
| 4 | 00110010 | 123 |
| 5 | 01110011 | 22 |
| 6 | -1 | 0 |
| 7 | 11000111 | 33 |
| 8 | 00100001 | 433 |
| 9 | 10010101 | 111 |
| 10 | 11010010 | 1 |
| 11 | 00111101 | 9 |
| 12 | 11111001 | 22 |
| 13 | 00010011 | 57 |
| 14 | -1 | 0 |
| 15 | 11111111 | 854 |
| 16 | 00010110 | 55 |
| 17 | -1 | 0 |
| 18 | 11101000 | 333 |

FIG. 13

| | Image Data Values | Count Value |
|---|---|---|
| 0 | -1 | 0 |
| 1 | -1 | 0 |
| 2 | -1 | 0 |
| 3 | -1 | 0 |
| 4 | -1 | 0 |
| 5 | 01110011 | 1 |
| 6 | -1 | 0 |
| 7 | -1 | 0 |
| 8 | -1 | 0 |
| 9 | 10010101 | 2 |
| 10 | 11010010 | 1 |
| 11 | -1 | 0 |
| 12 | -1 | 0 |
| 13 | -1 | 0 |
| 14 | -1 | 0 |
| 15 | -1 | 0 |
| 16 | -1 | 0 |
| 17 | -1 | 0 |
| 18 | -1 | 0 |

SYSTEM FOR HISTOGRAM COMPUTATION

CROSS REFERENCE TO RELATED APPLICATIONS

This application is related to, and claims benefit to and priority of, U.S. patent application Ser. No. 61/732,979, filed on Dec. 4, 2012, the contents of which are hereby incorporated by reference in their entirety for all purposes.

BACKGROUND

1. Field

The embodiments described below relate to the computation of digital image histograms.

2. Description

A histogram is an estimate of a probability density function of an image intensity. For each image pixel value within an image, a histogram specifies a number of occurrences of the image pixel value within the image. Many imaging algorithms use histograms during image analysis.

Efficient computation of an image histogram can be problematic. For example, a Compute Unified Device Architecture (CUDA)-based Graphical Processing Unit (GPU) employs a highly parallel computation model. Conventional algorithms for computing a histogram using this computation model can be either 1) efficient only with respect to certain (i.e., non-spiky) image data value distributions, or 2) independent of image data value distribution but inefficient.

Systems are desired to provide efficient histogram computation.

BRIEF DESCRIPTION OF THE DRAWINGS

The construction and usage of embodiments will become readily apparent from consideration of the following specification as illustrated in the accompanying drawings, in which like reference numerals designate like parts, and wherein:

FIG. 5 is a tabular representation of a first indexed array and a second indexed array of a shared memory according to some embodiments;

FIG. 6 is a tabular representation of a first indexed array and a second indexed array of a shared memory according to some embodiments;

FIG. 7 is a tabular representation of a first indexed array and a second indexed array of a shared memory according to some embodiments;

FIG. 8 is a tabular representation of a first indexed array and a second indexed array of a shared memory according to some embodiments;

FIG. 9 is a tabular representation of a first indexed array and a second indexed array of a shared memory according to some embodiments;

FIG. 10 is a tabular representation of a first indexed array and a second indexed array of a shared memory according to some embodiments;

FIG. 13 is a tabular representation of a first indexed array and a second indexed array of a shared memory according to some embodiments;

FIG. 14 is a tabular representation of a first indexed array and a second indexed array of a shared memory according to some embodiments.

DETAILED DESCRIPTION

The following description is provided to enable any person in the art to make and use the described embodiments and sets forth the best mode contemplated for carrying out the described embodiments. Various modifications, however, will remain readily apparent to those in the art.

Figure 1:
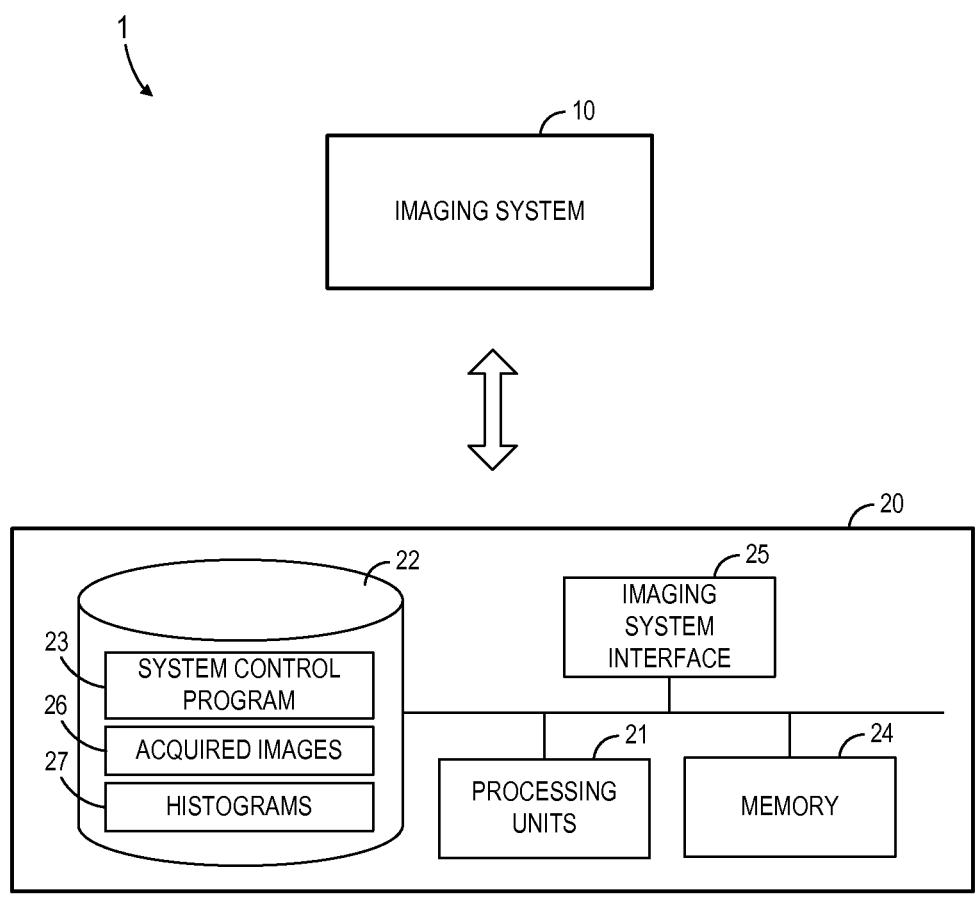
FIG. 1 illustrates a system according to some embodiments.

FIG. 1 illustrates system 1 according to some embodiments. System 1 includes imaging system 10 and control and processing system 20. Generally, and according to some embodiments, control and processing system 20 controls imaging system 10 to acquire images and receives the acquired images therefrom. Control and processing system 20 computes histograms based on the acquired images as described herein.

Imaging system 10 may comprise any system for acquiring images that is or becomes known. According to some embodiments, imaging system 10 may comprise an x-ray imaging system, a camera, a magnetic resonance imaging system, a positron emission tomography scanner, or a computed tomography imaging system. Images acquired by imaging system 10 include one or more data values for each pixel of the image.

System 20 may comprise any general-purpose or dedicated computing system. Accordingly, system 20 includes processing units 21 configured to execute processor-executable program code to cause system 20 to operate as described herein, and storage device 22 for storing the program code. Storage device 22 may comprise one or more fixed disks, solid-state random access memory, and/or removable media (e.g., a thumb drive) mounted in a corresponding interface (e.g., a USB port).

Storage device 22 stores program code of system control program 23. Processing units 21 may execute system control program 23 to compute a histogram of an acquired image as described herein. Such computation may involve processes performed in parallel.

Images acquired from system 10 are stored in data storage device 22 as acquired images 26, in DICOM or another data format. Each of acquired images 26 consists of image data values for each image pixel, and may be further associated with details of its acquisition, including but not limited to imaging plane position and angle, imaging position, radiation source-to-detector distance, patient anatomy imaged, patient position, contrast medium bolus injection profile, x-ray tube voltage, image resolution and radiation dosage. Histograms 27 are computed based on acquired images 26.

System 10 and system 20 may perform functions other than those attributed thereto herein, and may include any elements which are necessary for the operation thereof.

According to the illustrated embodiment, system 20 controls system 10 to acquire images 26 and also computes histograms 27. According to some embodiments, system 10 may be controlled by a dedicated control system, with acquired images 26 being provided to a system 20 over a computer network or via a physical storage medium (e.g., a DVD).

Figure 2A:
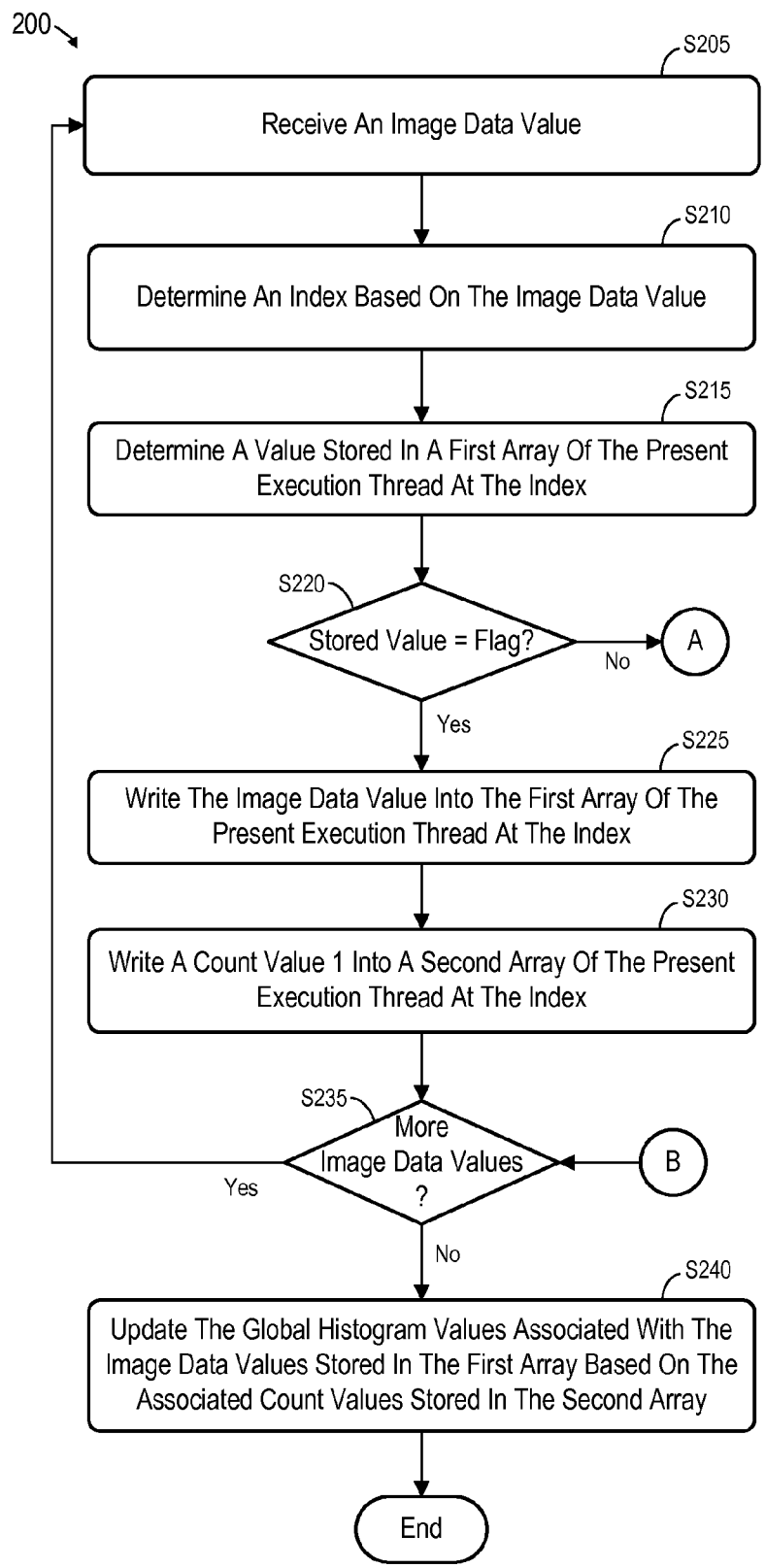
FIGS. 2a and 2b comprise a flow diagram of a process according to some embodiments.
Figure 2B:
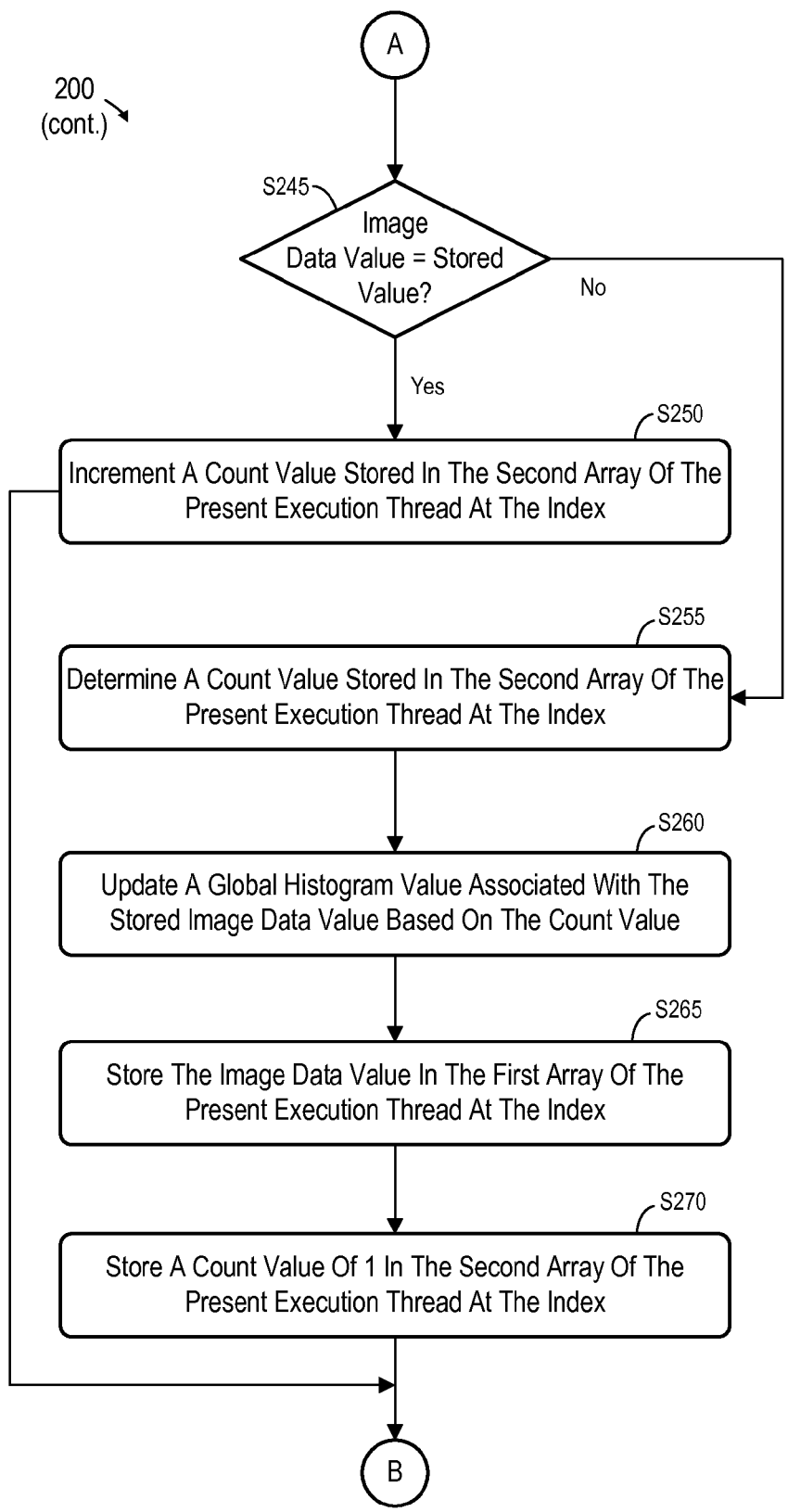

FIG. 2 is a flow diagram of process 200 according to some embodiments. Process 200 and the other processes described herein may be performed using any suitable combination of hardware, software or manual means. Software embodying these processes may be stored by any non-transitory tangible medium, including a fixed disk, a floppy disk, a CD, a DVD, a Flash drive, or a magnetic tape.

Figure 3:
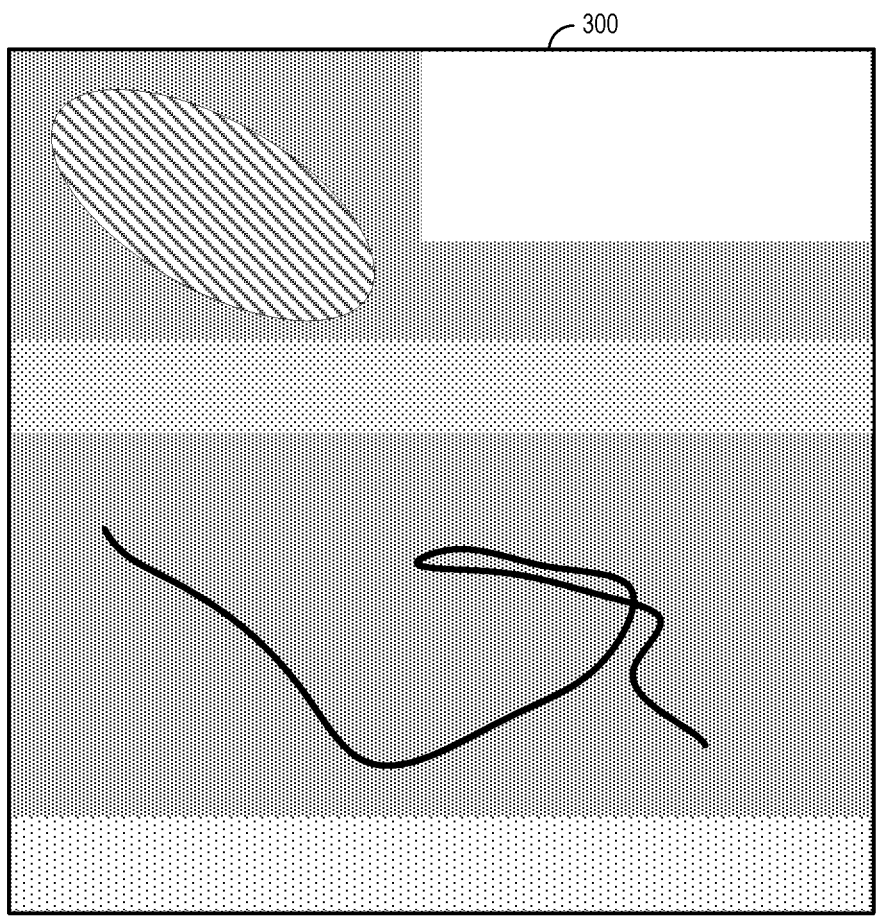
FIG. 3 illustrates an image according to some embodiments.

FIG. 3 illustrates image 300 for purposes of example. Each image pixel of image 300 is associated with at least one image data value. Process 200 will be described below with respect to the image data values of image 300. Embodiments may operate upon any type of image in which each image pixel is associated with at least one image data value. The image data value may represent any characteristic of the image pixel, including but not limited to luminance, brightness, color, etc.

According to some embodiments, process 200 is performed by each of several execution threads, independently and in parallel. An execution thread is provided by an associated processing unit. Accordingly, some embodiments are implemented by a multi-processing unit hardware architecture.

Figure 4:
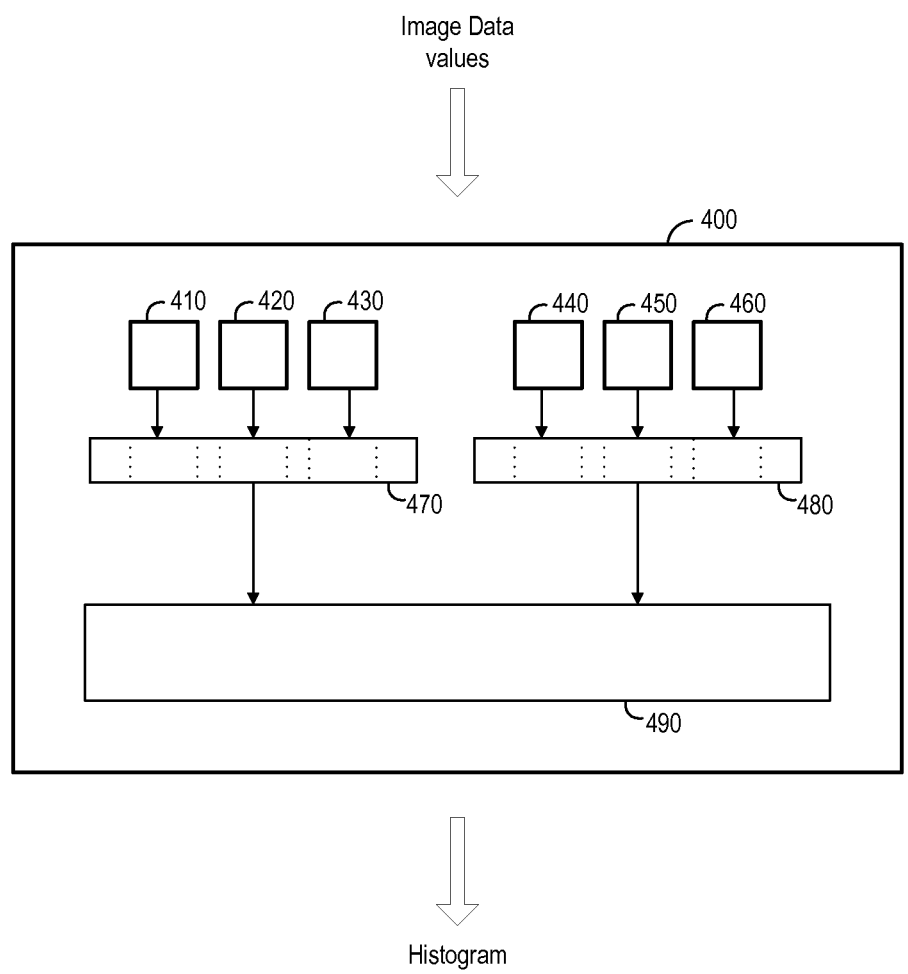
FIG. 4 is a block diagram of a system according to some embodiments.

FIG. 4 illustrates system 400 implementing a multi-processing unit hardware architecture according to some embodiments. System 400 includes processing units 410, 420, 430, 440, 450 and 460, each of which may comprise a processing core capable of executing one or more simultaneous execution threads.

System 400 also includes shared memory 470 and shared memory 480. Shared memory 470 is accessible by processing units 410, 420 and 430, and shared memory 480 is accessible by processing units 440, 450 and 460. According to some embodiments, each of processing units 410, 420 and 430 is allotted a dedicated portion of shared memory 470 for purposes of executing process 200. Similarly, each of processing units 440, 450 and 460 is allotted a dedicated portion of shared memory 480. A processing unit may write to its dedicated portion of shared memory without having to account for collisions, locks or other synchronization issues.

Common shared memory 490 is accessible by all of processing units 410, 420, 430, 440, 450 and 460. According to some embodiments, a global histogram is built within common shared memory 490 by processing units 410, 420, 430, 440, 450 and 460 as will be described below.

Embodiments are not limited to the architecture of system 400. Some embodiments may employ any number of processing units, shared memories, and processing units per shared memory. As mentioned above, process 200 is performed simultaneously by several execution threads. For clarity, the execution of process 200 by a single execution thread will be described below.

Initially, at S205, an image data value is received. The image data value is associated with a pixel of an image. More particularly, the received image data value is associated with a pixel which has been assigned to the present execution thread. In this regard, and according to some embodiments, an image is divided into equal blocks prior to process 200, with each block to be processed by a group of execution threads. Within a group of threads, each thread is assigned particular image pixels of its block.

The execution thread determines an index at S210 based on the received image data value. The index is an index to arrays which are associated with the execution thread within shared memory. FIG. 5 illustrates such arrays according to some embodiments.

As mentioned above, each processing unit may be associated with a portion of shared memory according to some embodiments. FIG. 5 illustrates the contents of such a portion of shared memory for a specific processing unit (and associated execution thread) according to some embodiments.

The portion of shared memory includes arrays 510 and 520. According to the illustrated embodiment, array 510 is an array of nineteen short integers to store image data values and array 520 is an array of nineteen floats to store local count values. Arrays 510 and 520 are indexed such that a single index is associated with one location of array 510 and one location of array 520. At the outset of process 200, each location of array 510 stores a flag (e.g., −1) and each location of array 520 stores a count value of zero. Embodiments are not limited to the size, data types, columns and values of FIG. 5.

Returning to S210, the index may be determined using any suitable hash function that is or becomes known. In one example, the index is determined using the formula: hash= (image data value*19)%4096). Accordingly, a same index may be determined at S210 for different image data values.

Next, at S215, a value stored at the index in a first array of the present execution thread is determined. For purposes of the present example, it will be assumed that an image data value "01110011" was received at S205 and an index "5" was determined at S210 based thereon. Embodiments are not limited to 8-bit image data values. It will also be assumed that arrays 510 and 520 are stored in a portion of shared memory (e.g., shared memory 470) which is assigned to the present execution thread. Accordingly, with reference to memory location 5 of array 510 of FIG. 5, a value of −1 is determined at S215.

At S220, it is determined whether the determined value is a flag. Since −1 is used as a flag in the present example, flow proceeds to S225, in which the image data value is written into the first array of the present execution thread at the index. Next, at S230, a count value of "1" is written into a second array of the present execution thread at the index. FIG. 6 shows the image data value "01110011" written into array 510 at index 5 according to S225, and the count value '1' written into array 520 of the present execution thread at index 5 according to S230.

It is determined at S235 whether more image data values remain to be processed by the present execution thread. If so, flow returns to S205.

It will be assumed that flow cycles between S205 and S235 two more times as described above to receive image data values "10010101" and "11010010", from which indexes of "9" and "10" are determined at S210. FIG. 7 illustrates arrays 510 and 520 as updated at S225 and S230 in response to these received values and determined indexes.

Next, it is assumed that the image data value "10010101" is received at S205. As described above, the index "9" is then determined at S210 based on this image data value. At S215, and with reference to FIG. 7, it is determined that the value "10010101" is stored in array 510 at index 9. Accordingly, since the stored value is not a flag, flow proceeds from S220 to S245.

At S245, it is determined whether the received image data value is equal to the stored value. In the present example, the received image data value (i.e., "10010101") is equal to the value stored in array 510 at index 9. Therefore, at S250, a count value stored at the index in the second array of the present execution thread is incremented. FIG. 8 illustrates incrementing of the count value stored at index 9 of array 520 at S250. Flow then returns to S235 to determine whether more image data values are to be processed.

It will now be assumed that that the image data value "00111000" is received at S205, and that the index "9" is determined at S210 based on this image data value. At S215, and with reference to FIG. 8, it is determined that the value "10010101" is stored in array 510 at index 9. Again, since the stored value is not a flag, flow proceeds from S220 to S245.

At S245, it is determined that the received image data value (i.e., "00111000") is not equal to the value stored at index 9 (i.e., "10010101"). Flow therefore continues to S255 to determine a count value stored in the second array at the index. In the present example, and again with reference to FIG. 8, the stored count value is 2.

A global histogram value associated with the stored image data value is updated at S260. For example, common shared memory 490 may store a global histogram associated with the currently-processed image. The histogram includes a bin for each image data value, and each bin includes a count value associated with its image data value. Accordingly, the count value associated with the stored image data value "10010101" in the global histogram is increased by 2 (i.e., the count value stored at index 9) at S260.

Next, at S265, the received image data value (i.e., "00111000") is stored in the first array at the index (i.e., 9). Additionally, at S270, a count value of 1 is stored at the index in the second array. FIG. 9 illustrates storage of these values at S265 and S270 according to the present example.

Flow therefore continues as described above until, at S235, it is determined that no more image data values remain to be processed by the current execution thread. This determination does not necessarily indicate that the image is fully processed, as other threads may be executing and/or other image data values may be waiting for assignment to an execution thread for processing.

The global histogram is updated at S240 in response to a negative determination at S235. Specifically, global histogram values associated with the image data values stored in the first array are updated based on the associated count values stored in the second array. In other words, the operation described above with respect to S260 is performed for each image data value stored in array 510.

FIG. 10 illustrates arrays 510 and 520 at S240 according to some embodiments. Each stored image data value is associated with a count value, and each count value is used to update (i.e., added to) a current count value associated with its image data value in the global histogram. According to some embodiments, this update and the update at S260 are performed atomically, so that collisions and other issues relating to simultaneous updates are avoided.

Figure 11:
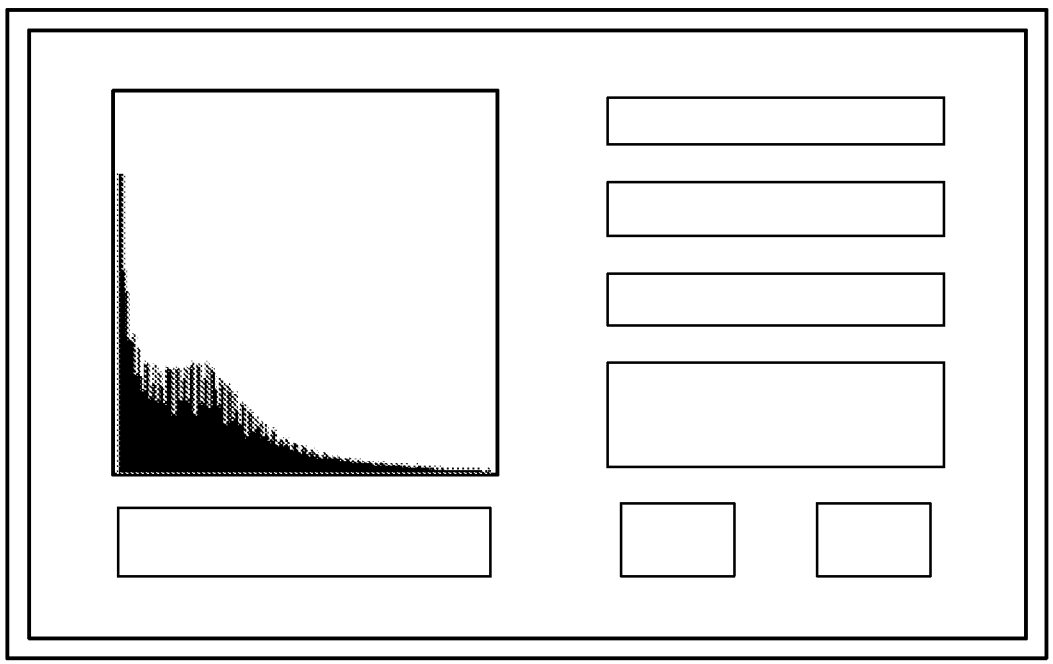
FIG. 11 illustrates a user interface according to some embodiments.

The global histogram is complete after process 200 has been performed by two or more processing units to process all image data values of an image. The global histogram may be used to perform subsequent image analysis. In some embodiments, the global histogram may be output to a display as shown in FIG. 11.

Figure 12:
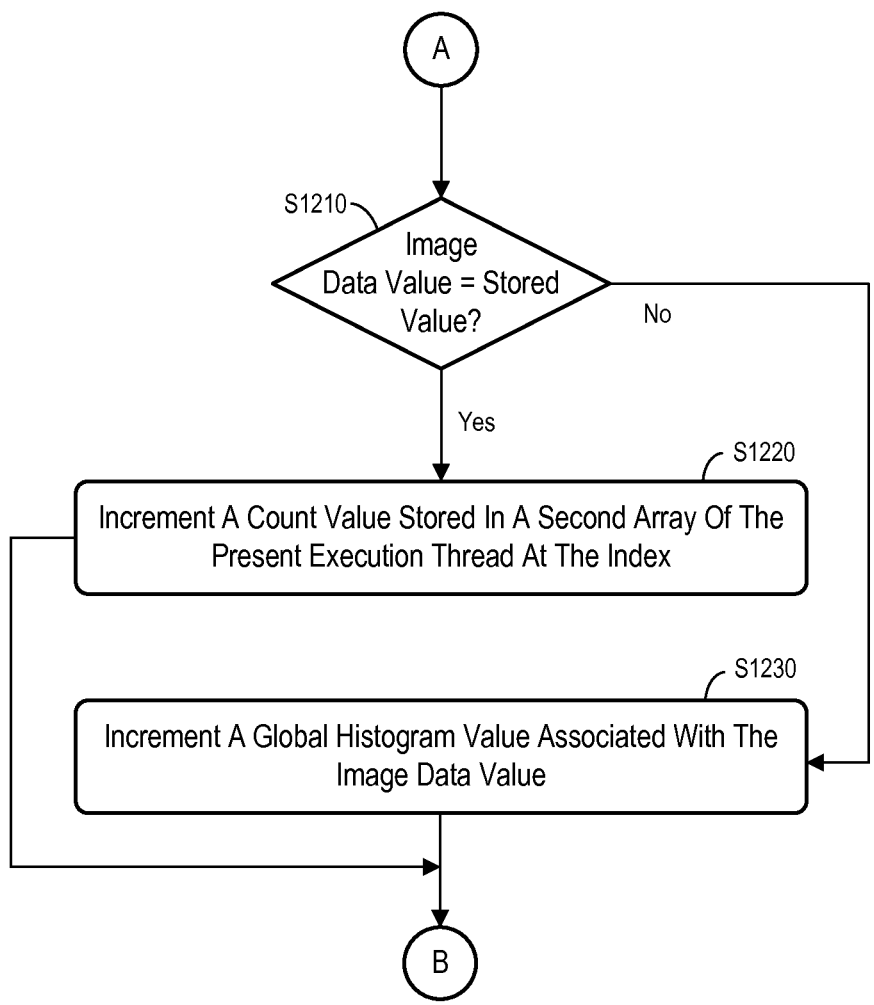
FIG. 12 comprises a flow diagram of a process according to some embodiments.

FIG. 12 is a flow diagram of alternative processing according to some embodiments. In particular, some implementations may substitute S1210-S1230 of FIG. 12 for S245-S270 of FIG. 2b. FIG. 12 differs from FIG. 2b only in a case that the received image data value does not equal the stored data value. FIG. 13 is provided as a duplicate of FIG. 8 to illustrate the process of FIG. 12 in the context of the prior example.

In this regard, it has been determined at S1210 that the received image data value (i.e., "00111000") is not equal to the value stored at index 9 (i.e., "10010101"). Flow therefore continues to S1230. At S1230, a global histogram value associated with the received image data value is incremented, and flow then returns to S235.

Accordingly, embodiments according to FIG. 12 do not overwrite image data values of the first array. FIG. 14 illustrates arrays 510 and 520 of such an embodiment after all image data values of the current execution thread have been processed. As shown, the image data values of array 510 at indexes 5, 9 and 10 remain unchanged from FIG. 13.

Figure 15:
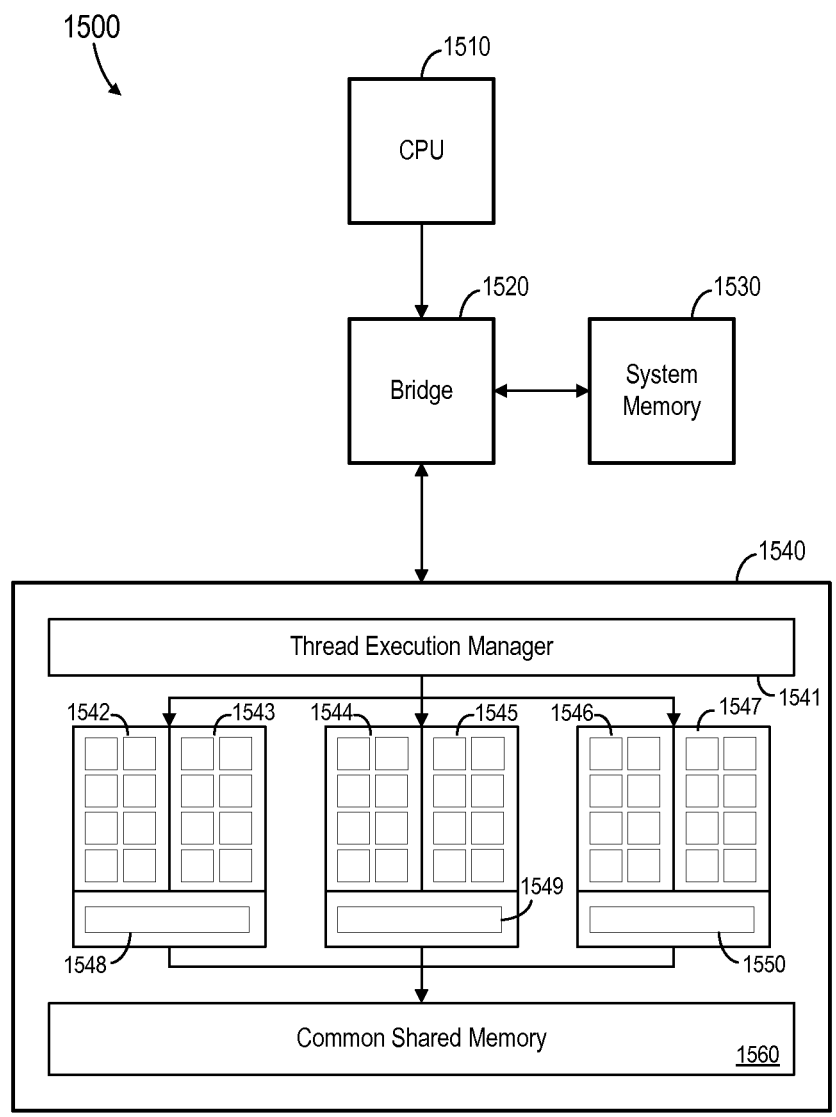
FIG. 15 is a block diagram of a system according to some embodiments.

FIG. 15 is a block diagram of architecture 1500 according to some embodiments. Architecture 1500 includes central processing unit (CPU) 1510, bridge 1520, system memory 1530 and graphics processing unit (GPU) 1540. According to some embodiments, each of elements 1510, 1520 and 1540 are implemented by a single-package integrated circuit.

CPU 1510 may comprise a microprocessor providing one or more processing cores, on-board caches and other elements. System memory 1530 may comprise Random Access Memory. Bridge 1520 is an interface between CPU 1510, system memory 1530 and GPU 1540.

According to some embodiments, thread execution manager 1541 spawns and schedules the threads to each multi-processor 1542-1547. Each multi-processor 1542-1547 contains eight stream processors in this example, and each pair of multi-processors shares an L1 cache 1548-1550. The L1 cache shared by a pair of multi-processors may serve as a shared memory for storing the above-described first and second arrays of each stream processor of the pair of multi-processors.

Common shared memory 1560 is shared amongst all the stream processors. Common shared memory 1560 may store a global histogram which may be atomically updated by each stream processor of GPU 1540.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A system comprising:
    a first processing unit;
    a first shared memory accessible by the first processing unit; and
    a second shared memory accessible by the first processing unit,
    wherein the first processing unit is to:
        receive a first image data value of a digital image;
        determine a first index based on the first image data value;
        determine a value stored in a first array of the first shared memory at the first index;
        determine if the value stored in the first array of the first shared memory at the first index is equal to the first image data value;
        if the value stored in the first array of the first shared memory at the first index is equal to the first image data value, add 1 to a count value stored in a second array of the first shared memory at the first index; and
        if the value stored in the first array of the first shared memory at the first index is not equal to the first image data value, update a count value stored in the second shared memory in association with the first image data value.

2. A system according to claim 1, wherein update of the count value stored in the second shared memory in association with the first image data value comprises:
    determining the count value stored in the second array of the first shared memory at the first index; and incrementing, by the determined count value, the count value stored in the second shared memory in association with the first image data value.

3. A system according to claim 2, wherein the first processing unit is further to:
determine if the value stored in the first array of the first shared memory at the first index is a flag; and
if it is determined that the value stored in the first array of the first shared memory at the first index is a flag, write the image data value into the first array of the first shared memory at the first index, and write a count value of 1 into the second array of the first shared memory at the first index.

4. A system according to claim 1, wherein update of the count value stored in the second shared memory in association with the first image data value comprises:
adding 1 to the count value stored in the second shared memory in association with the first image data value.

5. A system according to claim 4, wherein the first processing unit is further to:
determine if the value stored in the first array of the first shared memory at the first index is a flag; and
if it is determined that the value stored in the first array of the first shared memory at the first index is a flag, write the image data value into the first array of the first shared memory at the first index, and write a count value of 1 into the second array of the first shared memory at the first index.

6. A system according to claim 1, further comprising:
a second processing unit,
wherein the first shared memory is accessible by the second processing unit and the second shared memory is accessible by the second processing unit, and
wherein the second processing unit is to:
receive a second image data value of the digital image;
determine a second index based on the second image data value;
determine a second value stored in the first array of the first shared memory at the second index;
determine if the second value stored in the first array of the first shared memory at the second index is equal to the second image data value;
if the second value stored in the first array of the first shared memory at the second index is equal to the second image data value, add 1 to a second count value stored in the second array of the first shared memory at the second index; and
if the value stored in the first array of the first shared memory at the second index is not equal to the second image data value, update a second count value stored in the second shared memory in association with the second image data value.

7. A system according to claim 6, wherein update of the second count value stored in the second shared memory in association with the second image data value comprises:
determining the second count value stored in the second array of the first shared memory at the second index; and
incrementing, by the determined count value, the second count value stored in the second shared memory in association with the second image data value.

8. A system according to claim 6, wherein update of the second count value stored in the second shared memory in association with the second image data value comprises:
adding 1 to the second count value stored in the second shared memory in association with the second image data value.

9. A system according to claim 6, further comprising:
a third processing unit; and
a third shared memory,
wherein the first shared memory is not accessible by the third processing unit, the second shared memory is accessible by the third processing unit, and the third shared memory is accessible by the third processing unit, and
wherein the third processing unit is to:
receive a third image data value of the digital image;
determine a third index based on the third image data value;
determine a third value stored in a first array of the third shared memory at the third index;
determine if the third value stored in the first array of the third shared memory at the third index is equal to the third image data value;
if the third value stored in the first array of the third shared memory at the third index is equal to the third image data value, add 1 to a third count value stored in a second array of the third shared memory at the third index; and
if the third value stored in the first array of the third shared memory at the third index is not equal to the third image data value, update a third count value stored in the second shared memory in association with the third image data value.

10. A system according to claim 1, further comprising:
a second processing unit; and
a third shared memory accessible by the second processing unit,
wherein the first shared memory is not accessible by the second processing unit and the third shared memory is not accessible by the first processing unit, and
wherein the second processing unit is to:
receive a second image data value of the digital image;
determine a second index based on the second image data value;
determine a second value stored in a first array of the third shared memory at the second index;
determine if the second value stored in the first array of the third shared memory at the second index is equal to the second image data value;
if the second value stored in the first array of the third shared memory at the second index is equal to the second image data value, add 1 to a second count value stored in a second array of the third shared memory at the second index; and
if the second value stored in the first array of the third shared memory at the second index is not equal to the second image data value, update a second count value stored in the second shared memory in association with the second image data value.

11. A method comprising:
receiving, by a first execution thread, a first image data value of a digital image;
determining, by the first execution thread, a first index based on the first image data value;
determining, by the first execution thread, a value stored in a first array of a first shared memory at the first index;
determining, by the first execution thread, if the value stored in the first array of the first shared memory at the first index is equal to the first image data value;
if the value stored in the first array of the first shared memory at the first index is equal to the first image data value, adding, by the first execution thread, 1 to a count value stored in a second array of the first shared memory at the first index; and if the value stored in the first array of the first shared memory at the first index is not equal to the first image data value, updating, by the first execution thread, a count value stored in a second shared memory in association with the first image data value.

12. A method according to claim 11, wherein updating the count value stored in the second shared memory in association with the first image data value comprises:
  determining the count value stored in the second array of the first shared memory at the first index; and
  incrementing, by the determined count value, the count value stored in the second shared memory in association with the first image data value.

13. A method according to claim 12, further comprising:
  determining, by the first execution thread, if the value stored in the first array of the first shared memory at the first index is a flag; and
  if it is determined that the value stored in the first array of the first shared memory at the first index is a flag, writing the image data value into the first array of the first shared memory at the first index, and writing a count value of 1 into the second array of the first shared memory at the first index.

14. A method according to claim 11, wherein updating the count value stored in the second shared memory in association with the first image data value comprises:
  adding 1 to the count value stored in the second shared memory in association with the first image data value.

15. A method according to claim 14, further comprising:
  determining, by the first execution thread, if the value stored in the first array of the first shared memory at the first index is a flag; and
  if it is determined that the value stored in the first array of the first shared memory at the first index is a flag, writing the image data value into the first array of the first shared memory at the first index, and writing a count value of 1 into the second array of the first shared memory at the first index.

16. A method according to claim 11, further comprising:
  receiving, by a second execution thread, a second image data value of the digital image;
  determining, by the second execution thread, a second index based on the second image data value;
  determining, by the second execution thread, a second value stored in the first array of the first shared memory at the second index;
  determining, by the second execution thread, if the second value stored in the first array of the first shared memory at the second index is equal to the second image data value;
  if the second value stored in the first array of the first shared memory at the second index is equal to the second image data value, adding, by the second execution thread, 1 to a second count value stored in the second array of the first shared memory at the second index; and
  if the value stored in the first array of the first shared memory at the second index is not equal to the second image data value, updating, by the second execution thread, a second count value stored in the second shared memory in association with the second image data value.

17. A method according to claim 16, wherein updating the second count value stored in the second shared memory in association with the second image data value comprises:
  determining the second count value stored in the second array of the first shared memory at the second index; and
  incrementing, by the determined count value, the second count value stored in the second shared memory in association with the second image data value.

18. A method according to claim 16, wherein updating the second count value stored in the second shared memory in association with the second image data value comprises:
  adding 1 to the second count value stored in the second shared memory in association with the second image data value.

19. A method according to claim 16, further comprising:
  receiving, by a third execution thread, a third image data value of the digital image;
  determining, by the third execution thread, a third index based on the third image data value;
  determining, by the third execution thread, a third value stored in a first array of a third shared memory at the third index;
  determining, by the third execution thread, if the third value stored in the first array of the third shared memory at the third index is equal to the third image data value;
  if the third value stored in the first array of the third shared memory at the third index is equal to the third image data value, adding, by the third execution thread, 1 to a third count value stored in a second array of the third shared memory at the third index; and
  if the third value stored in the first array of the third shared memory at the third index is not equal to the third image data value, updating, by the third execution thread, a third count value stored in the second shared memory in association with the third image data value,
  wherein the first shared memory is not accessible by the third execution thread, the second shared memory is accessible by the third execution thread, and the third shared memory is accessible by the third execution thread.

20. A method according to claim 11, further comprising:
  receiving, by a second execution thread, a second image data value of the digital image;
  determining, by the second execution thread, a second index based on the second image data value;
  determining, by the second execution thread, a second value stored in a first array of a third shared memory at the second index;
  determining, by the second execution thread, if the second value stored in the first array of the third shared memory at the second index is equal to the second image data value;
  if the second value stored in the first array of the third shared memory at the second index is equal to the second image data value, adding, by the second execution thread, 1 to a second count value stored in a second array of the third shared memory at the second index; and
  if the second value stored in the first array of the third shared memory at the second index is not equal to the second image data value, updating, by the second execution thread, a second count value stored in the second shared memory in association with the second image data value,
  wherein the first shared memory is not accessible by the second execution thread, the second shared memory is accessible by the second execution thread, and the third shared memory is accessible by the second execution thread.

* * * * *